United States Patent
Lunati et al.

(10) Patent No.: US 7,921,187 B2
(45) Date of Patent: Apr. 5, 2011

(54) NEWSREADER FOR MOBILE DEVICE

(75) Inventors: Stephane Lunati, Fremont, CA (US);
Ken Goto, San Francisco, CA (US);
John Martin, Atherton, CA (US);
May-Li Khoe, San Francisco, CA (US);
Helen Ma, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 830 days.

(21) Appl. No.: 11/770,459

(22) Filed: Jun. 28, 2007

(65) Prior Publication Data
US 2009/0005087 A1 Jan. 1, 2009

(51) Int. Cl.
*G06F 15/16* (2006.01)
(52) U.S. Cl. .......................... 709/217; 709/203
(58) Field of Classification Search .................. 709/203, 709/217
See application file for complete search history.

(56) References Cited

U.S. PATENT DOCUMENTS

| 7,574,486 | B1 * | 8/2009 | Cheng et al. ............ 709/219 |
| 2001/0007980 | A1 * | 7/2001 | Ishibashi et al. ........ 705/26 |
| 2005/0188406 | A1 * | 8/2005 | Gielow et al. .......... 725/81 |
| 2008/0109532 | A1 * | 5/2008 | Denoual et al. ........ 709/219 |

* cited by examiner

*Primary Examiner* — Benjamin R Bruckart
(74) *Attorney, Agent, or Firm* — Fish & Richardson P.C.

(57) ABSTRACT

Providing information to a mobile device can include receiving a translation request from a mobile device, wherein the translation request includes a resource locator identifying information in a native format; accessing the information identified by the resource locator, wherein the information is retrieved from a local cache if available and otherwise is retrieved from a source associated with the resource locator; translating at least a portion of the information identified by the resource locator to generate a translated file in a supported format; and transmitting the translated file to the mobile device. Further, the information retrieved from a source associated with the resource locator can be stored in the local cache. Additionally, the information identified by the resource locator can be cleared from the local cache after a predetermined amount of time.

15 Claims, 9 Drawing Sheets

NEWSREADER FOR MOBILE DEVICE

The present disclosure relates to mobile devices, and to systems and methods for using a mobile device to access information formatted as a web feed or channel, such as information encoded in an RSS format.

BACKGROUND

Mobile devices can be configured to access and retrieve content, including web pages and multimedia content, over a wireless network connection. A wide variety of wireless protocols have been established to support wireless communications via a mobile device. For example, a mobile device can establish a wireless network connection through an access point, such as a cellular network or a wireless access point, including an 802.11g access point and a Wi-Fi hot spot. Once connected, the mobile device can access a number of information sources, including the internet and private networks. Further, the mobile device can use the wireless connection to receive e-mail messages, retrieve electronic documents, and access content servers to browse web pages. The types of information that can be presented on a mobile device have been expanded in recent years to include high-resolution images and multimedia streams.

Further, a mobile device can access one or more data feeds over the wireless data network. A data feed can be characterized by a particular web feed format, such as an RSS (Really Simple Syndication, RDF Site Summary, or Rich Site Summary) feed. RSS describes a family of web feed formats used to publish frequently updated content, including blog entries, news stories and headlines, podcasts, and job listings. An RSS document, which is referred to as a feed, a web feed, or a channel, can contain either a summary of content from an associated web site or a full text version of the web content. For example, an RSS feed can be employed for web syndication, in which one or more portions of content from a source web site are made available for use on other web sites. Further, the RSS feed can be used to identify the information most recently made available on a source web site, such as the latest news stories, forum posts, and listings.

SUMMARY

A mobile device executing a function limited application, such as a browser or reader application, can be configured to transmit a request for one or more items of content to an information provider. Further, the mobile device can be configured to determine whether information received in response to the request for content is supported by the function limited application hosted on the mobile device. For example, the mobile device can examine a content-type header received from an information provider to determine whether any unsupported content is being received, such as an RSS feed. In order to permit mobile access to a variety of information sources and content types, the present inventors recognized the need to request from a service provider reformatted or translated content corresponding to one or more types of unsupported content.

The present inventors also recognized the need for a service provider to cache original source content for which translated content has been previously requested. Further, the need to cache translated content corresponding to the original source content also was recognized. Additionally, the present inventors also recognized the need to structure the translated content in a single file to permit users to quickly navigate through the translated content. Accordingly, the techniques and apparatus described here implement algorithms for requesting, translating, and caching content for use on a mobile device.

In general, in one aspect, the subject matter can be implemented to include receiving a translation request from a mobile device, wherein the translation request includes a resource locator identifying information in a native format; accessing the information identified by the resource locator, wherein the information is retrieved from a local cache if available and otherwise is retrieved from a source associated with the resource locator; translating at least a portion of the information identified by the resource locator to generate a translated file in a supported format; and transmitting the translated file to the mobile device.

The subject matter also can be implemented such that the native format corresponds to an RSS feed. Further, the subject matter can be implemented to include storing in the local cache the information retrieved from a source associated with the resource locator. clearing the information identified by the resource locator from the local cache after a predetermined amount of time.

The subject matter also can be implemented to include storing the translated file in the local cache, wherein the translated file is associated with the information identified by the resource locator. The subject matter further can be implemented to include determining that the information identified by the resource locator has been updated at the source associated with the resource locator; and clearing the translated file from the local cache. Additionally, the subject matter can be implemented to include automatically generating the translation request, by the mobile device, in response to receiving information associated with the resource locator in an unsupported format.

The subject matter also can be implemented such that the mobile device detects the unsupported format based on a value included in a content-type field. The subject matter further can be implemented such that the translated file comprises a HyperText Markup Language file. Additionally, the subject matter can be implemented to include displaying the translated file as an index including a plurality of links, wherein selecting a link causes a first portion of the translated file to be hidden and a second portion of the translated file to be displayed.

In general, in another aspect, the subject matter can be implemented as a computer program product, encoded on a computer-readable medium, operable to cause data processing apparatus to perform operations comprising receiving a translation request from a mobile device, wherein the translation request includes a resource locator identifying information in a native format; accessing the information identified by the resource locator, wherein the information is retrieved from a local cache if available and otherwise is retrieved from a source associated with the resource locator; translating at least a portion of the information identified by the resource locator to generate a translated file in a supported format; and transmitting the translated file to the mobile device.

Further, the subject matter can be implemented such that the native format corresponds to an RSS feed. The subject matter also can be implemented to be further operable to cause data processing apparatus to perform operations comprising storing in the local cache the information retrieved from a source associated with the resource locator. Additionally, the subject matter can be implemented to be further operable to cause data processing apparatus to perform operations comprising clearing the information identified by the resource locator from the local cache after a predetermined amount of time.

The subject matter also can be implemented to be further operable to cause data processing apparatus to perform operations comprising storing the translated file in the local cache, wherein the translated file is associated with the information identified by the resource locator. Further, the subject matter can be implemented to be further operable to cause data processing apparatus to perform operations comprising determining that the information identified by the resource locator has been updated at the source associated with the resource locator; and clearing the translated file from the local cache. Additionally, the subject matter can be implemented to be further operable to cause data processing apparatus to perform operations comprising automatically generating the translation request, by the mobile device, in response to receiving information associated with the resource locator in an unsupported format.

Further, the subject matter can be implemented such that the mobile device detects the unsupported format based on a value included in a content-type field. The subject matter also can be implemented such that the translated file comprises a HyperText Markup Language file. Additionally, the subject matter can be implemented to be further operable to cause data processing apparatus to perform operations comprising displaying the translated file as an index including a plurality of links, wherein selecting a link causes a first portion of the translated file to be hidden and a second portion of the translated file to be displayed.

The techniques described in this specification can be implemented to realize one or more of the following advantages. For example, the techniques can be implemented such that one or more types of content that are not supported by a function limited application can be translated into a supported format. The techniques also can be implemented such that the request for translated information can be automatically generated upon detecting that content is being received in an unsupported format. The techniques further can be implemented to include caching at a service provider one or more of the source content represented in an unsupported format and the translated content corresponding to the source content. Additionally, the techniques can be implemented to include automatically transmitting a request for translated content in response to detecting the receipt of information in an unsupported format.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
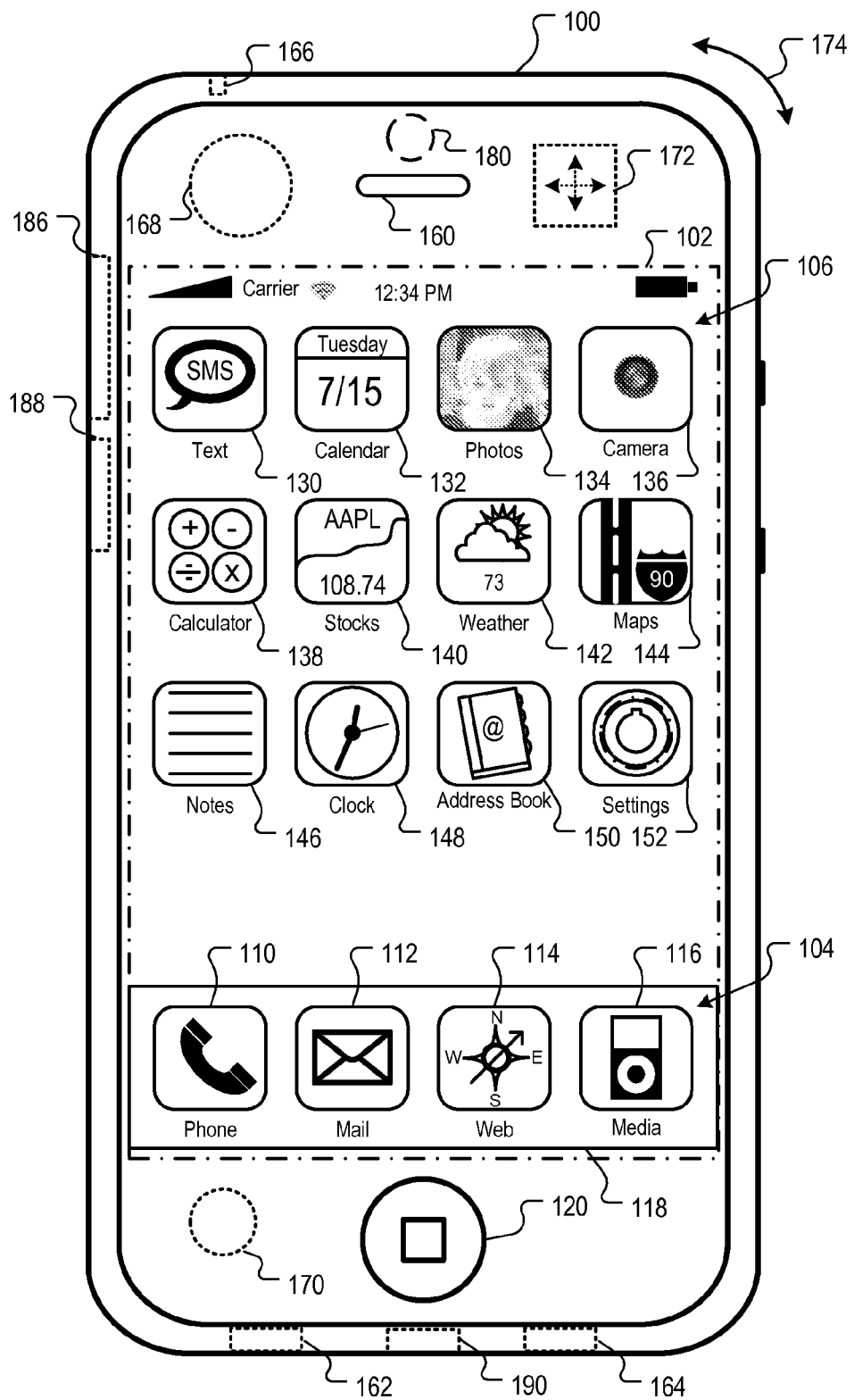
FIG. 1 shows a block diagram of an example mobile device.

FIG. 1 is a block diagram of an example mobile device 100. The mobile device 100 can be implemented in a handheld computer, a personal digital assistant, a cellular telephone, a network appliance, a camera, a smart phone, an enhanced general packet radio service (EGPRS) mobile phone, a network base station, or a combination of any two or more of these data processing devices, or other data processing devices.

The mobile device 100 can include a touch-sensitive display 102. The touch-sensitive display 102 can be implemented using any touch-sensitive display technology known in the art, including liquid crystal display (LCD) technology and light emitting polymer display (LPD) technology. Further, the touch-sensitive display 102 can be sensitive to haptic and/or tactile contact with a user. In some implementations, the touch-sensitive display 102 can be configured as a multi-touch-sensitive display, which can process multiple simultaneous touch points, including processing data related to the pressure, degree and/or position of each touch point. Multi-touch processing facilitates complex gestures and interactions, such as multiple finger gestures and chording. Other touch-sensitive display technologies also can be used, including a display in which contact is made using a pointing device, such as a stylus, or in which actual contact is not required, such as an infra-red proximity based display. Some examples of multi-touch-sensitive display technology are described in U.S. Pat. Nos. 6,323,846; 6,570,577; and 6,677,932; and U.S. Patent Publication 2002/0015024A1, each of which is incorporated by reference herein in its entirety.

The mobile device 100 also can include one or more graphical user interfaces displayed on the touch-sensitive display 102 for providing user access to the various system objects and for conveying information to the user. In some implementations, the graphical user interface can include one or more display objects, such as display objects 104 and 106. In the example shown, the display objects 104 and 106, are graphic representations of system objects, such as device functions, applications, windows, files, alerts, events, or other identifiable system objects.

Further, the mobile device 100 can implement multiple device functionalities. For example, the mobile device 100 can be configured to include a telephony device, as indicated by a phone object 110; an e-mail device, as indicated by the e-mail object 112; a network data communication device, as indicated by the Web object 114; and a media processing device, as indicated by the media player object 116. The mobile device 100 also can be configured to include a Wi-Fi base station device (not shown). Additionally, one or more display objects 104, such as the phone object 110, the e-mail object 112, the Web object 114, and the media player object 116, can be displayed in a function menu bar 118. Thus, a particular device functionality can be accessed from a top-level graphical user interface, such as the graphical user interface illustrated in FIG. 1. The touch-sensitive display 102 can be contacted, such as by a finger or stylus, in an area associated with a displayed object to invoke the corresponding functionality.

In some implementations, the graphical user interface of the mobile device 100 can change when a particular device functionality is invoked. For example, the graphical user interface presented on the mobile device 100 can be augmented with one or more user interface elements or replaced with another user interface, to facilitate user access to particular functions associated with the invoked device functionality. For example, in response to a user touching the phone object 110, the graphical user interface of the touch-sensitive display 102 can present one or more display objects related to phone functionality. Similarly, touching the email object 112 can cause the graphical user interface to present one or more display objects related to e-mail functionality; touching the Web object 114 can cause the graphical user interface to present one or more display objects related to Web-surfing functionality; and touching the media player object 116 can cause the graphical user interface to present display objects related to one or more media processing functionality.

In some implementations, the top-level graphical user interface environment or state of FIG. 1 can be restored by pressing a home button 120 located near the bottom the mobile device 100. In some implementations, one or more graphical user interfaces corresponding to a particular device functionality can have a corresponding home display object (not shown) that is presented on the touch-sensitive display 102. The graphical user interface environment of FIG. 1 can be restored from a particular device functionality by pressing the home display object.

In some implementations, the top-level graphical user interface can include one or more additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. A display object can be activated or invoked by contacting the touch-sensitive display 102 in an area associated with the display object. For example, touching the SMS display object 130 can invoke an SMS messaging environment and supporting device functionality Once in an environment corresponding to a display object, the top-level graphical user interface environment of FIG. 1 can be restored by pressing the home button 120.

Additional and/or different display objects also can be displayed in the graphical user interface of FIG. 1. For example, if the device 100 is connecting or utilizing services from an external service device, one or more "connection" icons may appear in the graphical user interface to indicate the connection. In some implementations, the display objects 106 can be configured by a user, e.g., a user may specify which display objects 106 are displayed, and/or may download additional applications or other software that provides other device functionalities and corresponding display objects.

The mobile device 100 also can include one or more input/output (I/O) devices and/or sensor devices. For example, a speaker 160 and a microphone 162 can be included to facilitate voice-enabled functionalities, such as phone and voice mail functions. The microphone 162 also can be configured as a user interface to receive one or more commands from a user. Further, the speaker 160 can be configured to output audio information and audio prompts to a user. In some implementations, a loud speaker 164 can be included to facilitate hands-free communication functionalities, such as speaker phone. An audio jack 166 also can be included as an interface for headphones and/or a microphone.

A proximity sensor 168 can be included to facilitate the detection of the user positioning the mobile device 100 proximate to the user's ear and, in response, to disengage the touch-sensitive display 102 to prevent accidental function invocations. Further, the touch-sensitive display 102 can be turned off to conserve power when the mobile device 100 is proximate to the user's ear.

One or more other sensors also can be included in the mobile device 100. For example, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 can include circuitry and/or sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., a port device 190) to provide access to the location-based services.

The mobile device 100 can also include a camera, including a camera lens and sensor 180. The camera lens and sensor 180 can be included on the front, or face, of the mobile device 100. Alternatively, the camera lens and sensor 180 can be located on the back surface of the mobile device 100. The camera can be configured to capture still images and/or video images. Further, the captured images can be stored on a storage device included in the mobile device 100.

Additionally, the mobile device 100 can include one or more wireless communication subsystems configured to operate using one or more communication protocols, such as an 802.11b/g communication device 186 and/or a Bluetooth™ communication device 188. Other communication devices operating using one or more additional communication protocols also can be included in the mobile device 100, including other 802.x communication protocols (e.g., WiMax, Wi-Fi, 3G), code division multiple access (CDMA), global system for mobile communications (GSM), and Enhanced Data GSM Environment (EDGE).

In some implementations, a port device 190 can be included in the mobile device 100. The port device 190 can be any wired port, including a Universal Serial Bus (USB) port, a FireWire (IEEE 1394) port, a network port, and a proprietary docking port. The port device 190 can be utilized to establish a wired connection with one or more other computing devices, such as other communication devices, a personal computer, a printer, or other processing devices capable of receiving and/or transmitting data. The port device 190 also can be used to transfer power to the mobile device 100, such as to recharge a battery included in the mobile device 100. The port device 190 further can be configured to allow the mobile device 100 to synchronize with a host device using one or more protocols, such as TCP/IP, HTTP, or UDP. In some implementations, a TCP/IP over USB protocol can be used.

The mobile device 100 also can be multimedia and/or internet-enabled. Thus, the mobile device 100 can be configured to access websites, online services (e.g., file hosting, caching, .MAC, etc.), network services (e.g., map services, web services, syncing services, etc.), and other resources through a web browser hosted on the mobile device 100. Further, the web browser can be function limited, and one or more of the online services, network services, and other resources can be accessed to increase the usability or functionality of the web browser and the mobile device 100. For example, the mobile device 100 can be configured to communicate with an online service provider or network services application to access features and functions otherwise not supported by the function limited browser. To do so, the mobile device 100 can communicate with the online service provider or network services application (e.g., a .MAC server) to request and obtain one or more features or functions that otherwise are not supported by the limited function browser.

For example, a user may wish to access a particular link included in a web page that is associated with one or more types of content. The link can correspond to content that is not supported by the browser hosted on the mobile device 100, including content formatted as a web feed, such as an RSS (Really Simple Syndication, RDF Site Summary, or Rich Site Summary) feed. Upon accessing the content associated with the link, the mobile device 100 can determine whether unsupported content, such as an RSS feed, is included in the selected link. For example, if an RSS feed is included in the content associated with the selected link, information formatted as an RSS feeds is received by the web browser in response to selecting the link. Thus, the web browser can recognize that the link is associated with one or more types of content, the native format of which is not supported.

If a web browser, such as Apple's Mobile Safari (available from Apple Inc. of Cupertino Calif.), hosted on the mobile device 100 does not support one or more portions of the information received in response to accessing the selected link, the unsupported information can be displayed incorrectly or not at all. Thus, the web browser hosted on the mobile device 100 can be configured to determine whether unsupported information is being received. For example, the browser can analyze a content-type header or tag received as part of the information associated with the accessed link. Upon determining that one or more items of unsupported information are being received, such as an RSS feed, the mobile device 100 can terminate the receipt of information, such as by discarding any additional information that is received corresponding to the accessed link or by closing an associated port. Further, the mobile device 100 can be configured to automatically transmit a request to an external service provider, such as a .MAC server, identifying the source of the information that is encoded in an unsupported format.

In response to the request, the external service provider can supply information associated with the selected link in a format that is supported by the web browser hosted on the mobile device 100, such as an HTTP format. For example, the mobile device 100 can forward a URL identifying the selected link to the external service provider, such as a .MAC server, for translation. The external service provider can translate the information associated with the identified URL and transmit the translated information to the mobile device 100.

Figure 2:
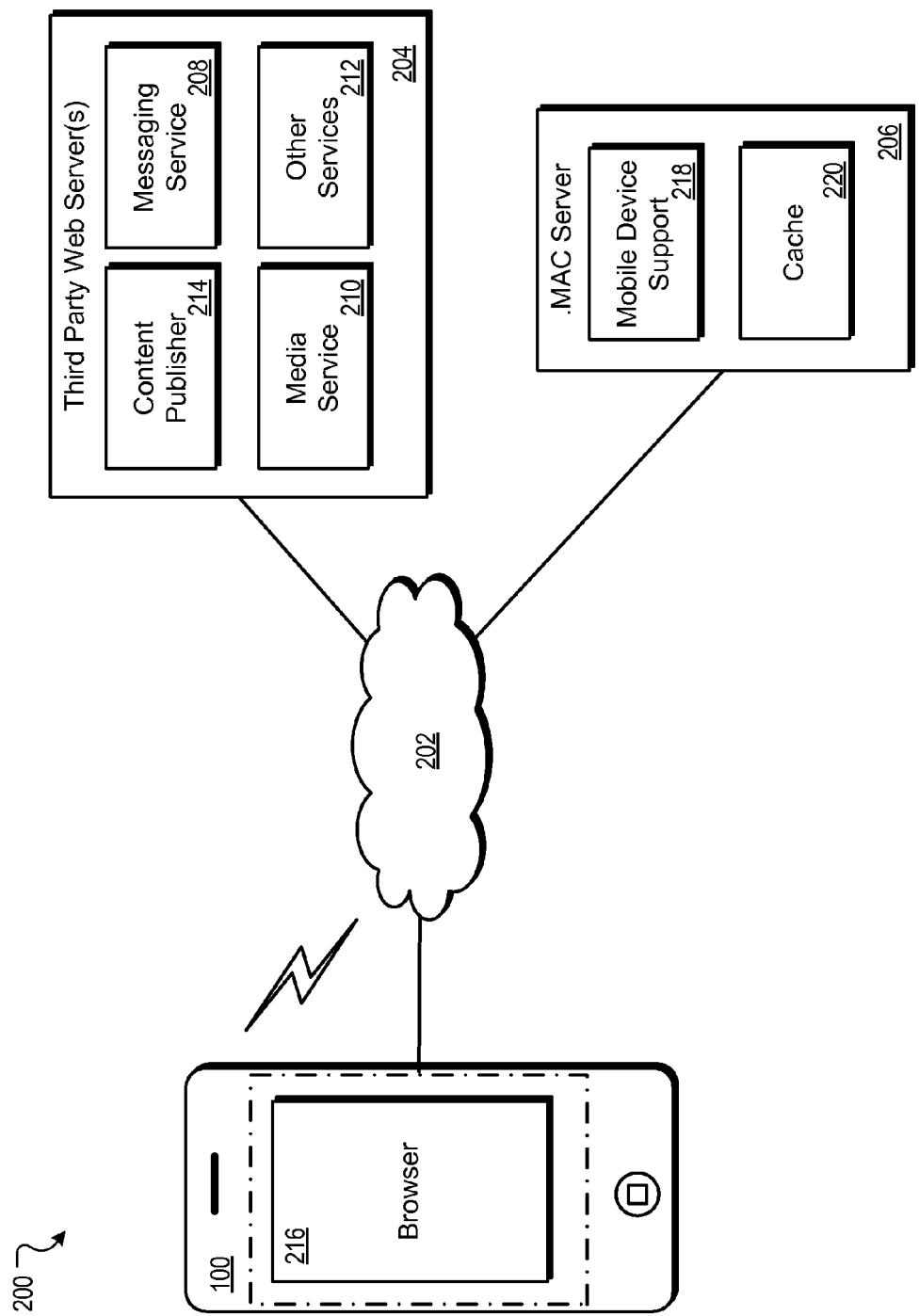
FIG. 2 shows a block diagram of an example network in which the mobile device can operate.

FIG. 2 shows a block diagram of an example network in which the mobile device can operate. The network operating environment 200 includes the mobile device 100 communicatively coupled to one or more third party web servers 204 and one or more external service providers, including a .MAC server 206 over a network 202. In general, the mobile device 100 can transmit and receive data over one or more wired and/or wireless data networks, including the network 202. In some implementations, both voice and data communications can be established over the network 202. For example, the mobile device 100 can place and receive telephone calls (e.g., using VoIP protocols), send and receive email messages (e.g., using POP3 protocol), and retrieve electronic documents and/or data streams, such as web pages, photographs, and videos, over the network 202 (e.g., TCP/IP or UDP protocols).

The network 202 facilitates wireless or wireline communication between the mobile device 100 and any other local or remote computer, including the third party web servers 204 and the .MAC server 206. The network 202 can be all or a portion of a distributed or secure network. In another implementation, the network 202 can be a virtual private network (VPN) between the mobile device 100 and a service provider, such as the .MAC server 206. The VPN can be implemented across a wireline or a wireless link using any communication protocol, such as an 802.x protocol or WiMax. While illustrated as a single or continuous network, the network 202 also can be logically divided into a plurality of sub-nets or virtual networks without departing from the scope of this disclosure, so long as at least a portion of the network 202 can facilitate communications between the mobile device 100 and at least one server. Thus, the network 202 encompasses any internal or external network, networks, sub-network, or any combination thereof operable to facilitate communications between various computing components in the network operating environment 200. Further, the network 202 can be configured to communicate using Internet Protocol (IP) packets, Frame Relay frames, Asynchronous Transfer Mode (ATM) cells, voice, video, data, and any other suitable information carrier between network addresses. The network 202 also can include one or more local area networks (LANs), radio access networks (RANs), metropolitan area networks (MANs), wide area networks (WANs), all or a portion of the global computer network known as the Internet, and/or any other communication system or systems accessible at one or more locations. Further, the network 202 can be configured as a secure network, an unsecured network, or a combination thereof.

The mobile device 100 can communicate with the one or more third party web servers 204. For example, the mobile device 100 can invoke one or more services hosted on a third party web server 204, including messaging services 208, media services 210, and other services 212. The mobile device 100 also can access one or more content publishers 214 associated with the one or more third party web servers 204. For example, the messaging service 208 can be accessed to provide email and/or other messaging services to the mobile device 100. In the example shown, a user of the mobile device 100 has invoked a browser 216, e.g., by touching the Web object 114 on the top-level graphical user interface shown in FIG. 1. The browser 216 can be used to access the messaging service 208 to access the user's web-based email. In another example, the user of the mobile device 100 can select the Mail object 112 to invoke the messaging service 208 to access email (e.g., using POP3 protocol).

The mobile device 100 also can access a media service 210, for example, to provide access to media files, such as song files, movie files, video clips, and other media data. One or more other services 212 also can be accessed by the mobile device 100. For example, a syncing service can perform syncing services (e.g., sync files) with the mobile device 100. An activation service can perform an activation process for activating the mobile device 100. Further, a software update service can be configured to automatically determine whether software updates exist for software hosted on the mobile device 100 and can automatically download one or more software updates to the mobile device 100.

The mobile device 100 can also access other data and content over network 202. For example, the mobile device 100 can access a content publisher 214 to retrieve information content, such as news, location information, blogs, and social networking sites. As described above, the content publisher 214 can be accessed by the mobile device 100 through a web browser 216.

The mobile device 100 also can access a service provider, such as the .MAC server 206 to request one or more services. The .MAC server 206 can include mobile device support 218 for file hosting, caching, translation, rendering, and other such services. For example, the mobile device support 218 can be configured to translate an RSS feed that is not supported by the browser 216 of the mobile device 100. In an implementation, Javascript/DOM can be used to mimic the behavior of a standard RSS reader. A pure form RSS reader can be required to submit several separate HTTP requests for each user selected link (e.g., a news article on a webpage). The mobile device support 218 can be configured to mimic the RSS reader to improve the responsiveness perceived by a user. For example, the mobile device support 218 can request the HTTP content associated with an RSS feed and can render/recreate the HTTP content as an HTML page.

The mobile device 100 can be configured to automatically access a service provider, such as the .MAC server 206, when the mobile device 100 determines that it requires assistance from an external device. For example, the mobile device 100 can communicate with the mobile device support 218 of the .MAC server 206 to translate web content that is unreadable or otherwise unsupported by the browser 216. A website, such as CNN.com, can include content formatted as an RSS feed, which the browser 216 cannot process and display. When the browser 216 determines that an RSS feed is included in content received from a content provider, such as in response to accessing a link, the mobile device 100 can automatically communicate with the mobile device support 218 of the .MAC server 206 to request a translation of the RSS feed information.

In the network operating environment 200, the .MAC server 206 also includes a cache 220. The cache 220 can be configured to store previously requested URLs, RSS feed data, and translated HTML pages. For example, if the browser 216 is used to select a previously accessed link, such as the link on CNN.com, the translated HTML page corresponding to the link can be accessed from the cache 220 and provided to the mobile device 100. Caching one or more translated HTML pages corresponding to one or more translation requests can decrease the time required to display a translated webpage in the browser 216. Further, some web pages that include information formatted as an RSS feed are periodically updated. In some implementations, the .MAC server 206 can receive update notifications when a translated cached page has been updated and the updated page can be automatically translated and cached.

Each of the instructions and applications identified in this disclosure can correspond to a set of instructions for performing one or more functions. These instructions need not be implemented as separate software programs, procedures or modules. The device may include any number of memory modules, processors, sensors, and other peripherals. Furthermore, various functions of the mobile device 100 may be implemented in hardware and/or in software, including in one or more signal processing and/or application specific integrated circuits.

Figure 3:
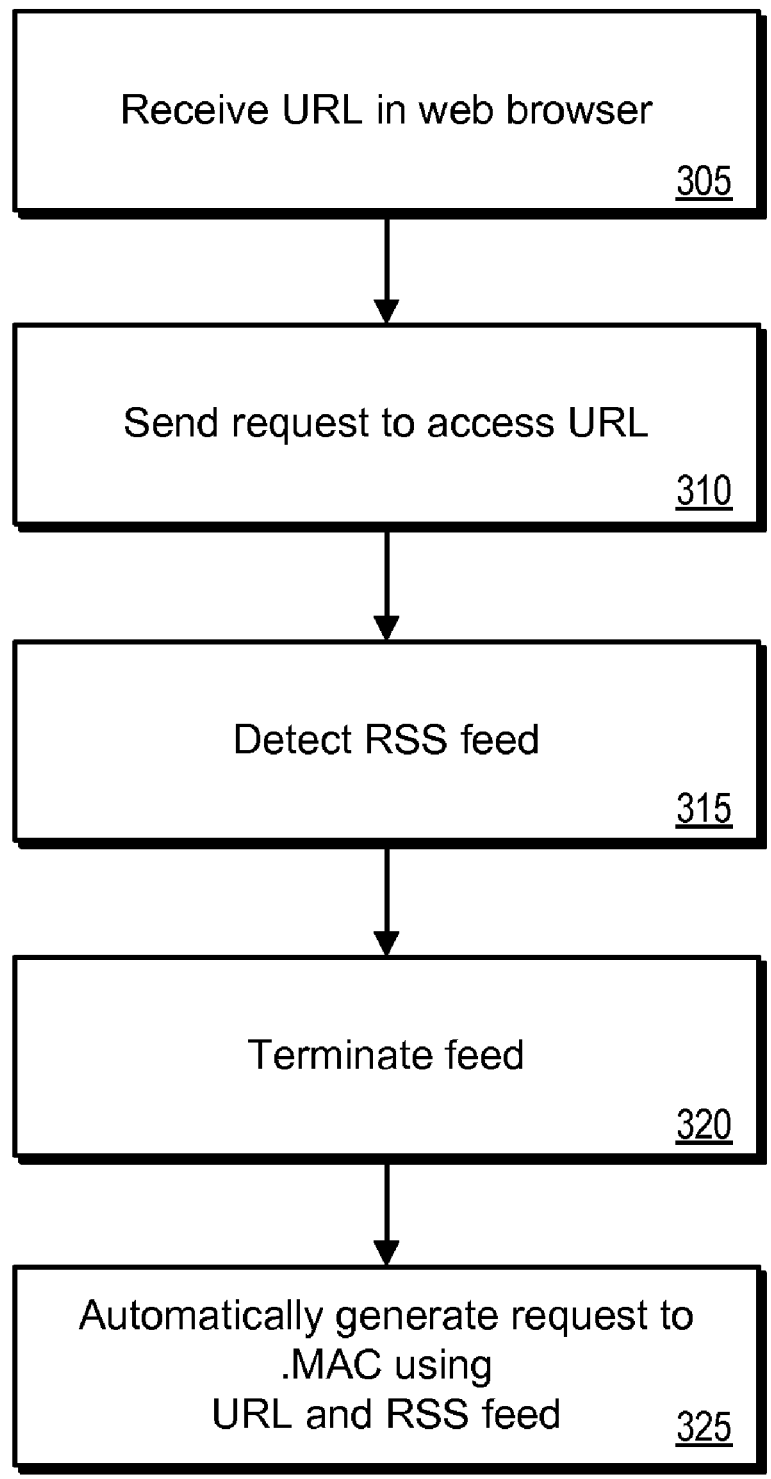
FIG. 3 presents a flowchart for generating a service request to a service provider.

FIG. 3 presents a flowchart for generating a service request to a service provider, such as a .MAC server. For example, a mobile device 100 can generate the service request in response to determining that content accessed through the browser 216 includes unsupported content, such as an RSS feed. In other implementations, the service request can be generated by any device, wired or wireless, that includes a function limited browser or otherwise is unable to process one or more types of information or services.

The mobile device 100 can receive a URL in a web browser (305). For example, a user can enter a URL into a web browser on the mobile device, such as by typing the URL into an address bar, selecting the URL from a menu, or selecting a URL included in a web page displayed in the browser. Further, the mobile device 100 can send a request to the content provider associated with the URL to access the entered URL (310). The request can be formatted and transmitted in accordance with any supported protocol, including HTTP and UDP.

Upon receiving a response to the request to access the URL, the mobile device 100 can detect whether an RSS feed or other unsupported format is associated with the URL (315). For example, the RSS feed can be detected according to the content type of the URL (e.g., text, image, video, audio, etc.). In general, the content type can be detected in the first few bytes of the received RSS feed, such as by accessing a content-type header included in the received information. The content type also can be determined by identifying an XML tag associated with an RSS feed. An RSS feed corresponds to a single HTML page. Thus, only one HTTP request is transmitted to access the RSS feed. Therefore, if an RSS feed is detected in the information received in response to a request to access a link, such as a URL, the mobile device 100 can terminate the receipt of information associated with the RSS feed (320). For example, the mobile device 100 can close the port to terminate the feed or discard the information received in response to the request. Further, in response to detecting the unsupported information received in response to the request, the mobile device 100 can automatically generate a request to a service provider, such as the .MAC server, to receive a translated version of the information corresponding to the URL (325). The request to receive translated information can be structured as a single request addressed to the translation service provider that includes a URL identifying the information that is to be translated. For example, a single HTTP request can include both the URL of the service provider and the URL of the information to be translated.

Figure 4:
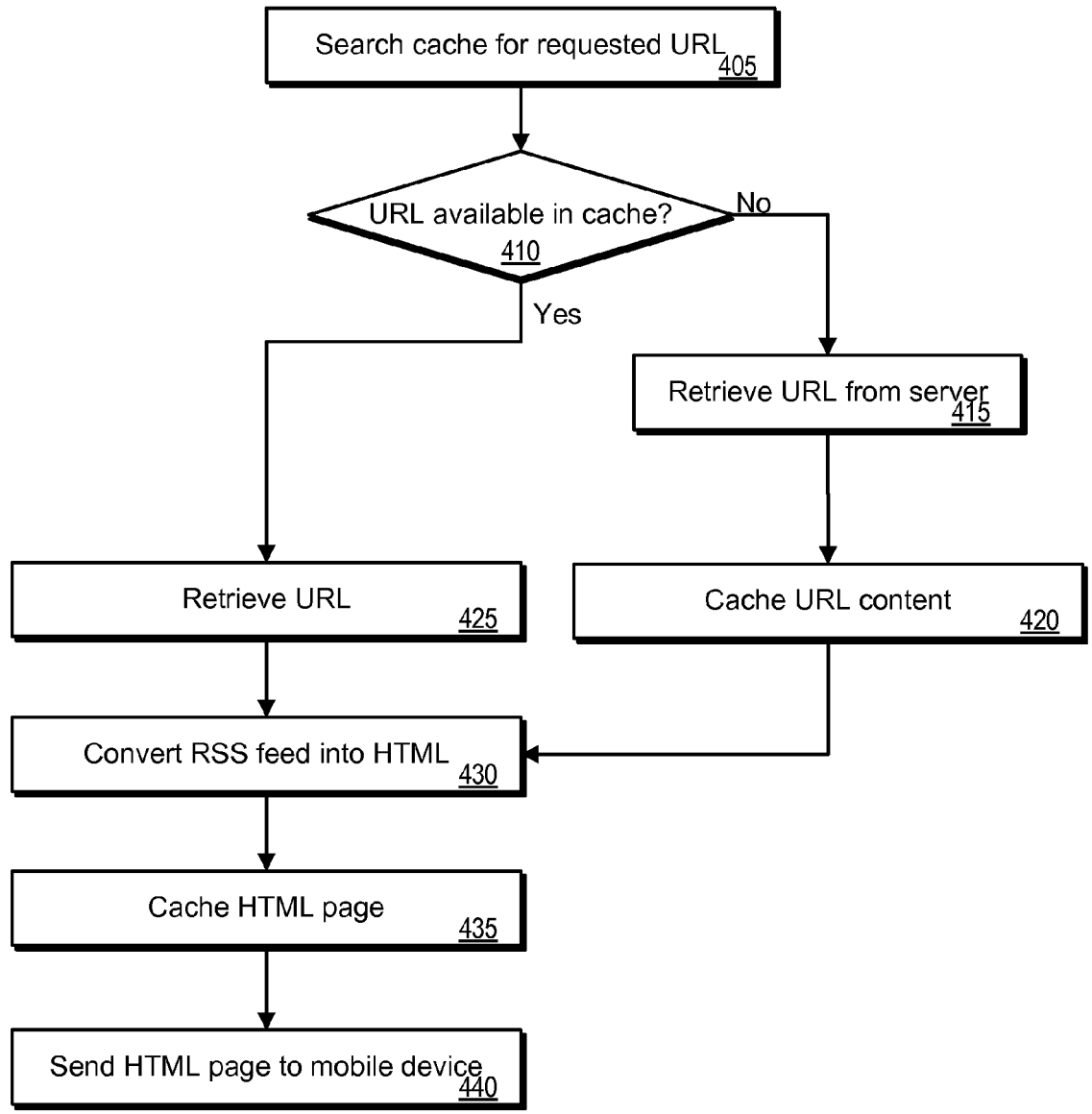
FIG. 4 presents a flowchart for delivering a requested service to a mobile device.

In an implementation, the service request generated in FIG. 3 can be received at the service provider, such as the .MAC server 206. Accordingly, FIG. 4 presents a flowchart for delivering a requested service to a mobile device. Upon receiving a service request from a mobile device 100, the .MAC server 206 can determine the source for the requested information. For example, the mobile device support 218 can begin the translation process by loading the user-selected URL. The mobile device support 218 can be configured to search the cache 220 first to determine whether it includes the requested information associated with the target URL (405). If the target URL is determined to be unavailable (410) in the cache 220, the mobile device support 218 can retrieve the information associated with the target URL from the source (415), such as a third-party web server. Upon receiving the information corresponding to the target URL, the mobile device support 218 can cache the URL content (420). In some implementations, information corresponding to the target URL can be located in the cache 220, but can be outdated. The outdated information can be cleared from the cache 220 and a current version of the information corresponding to the target URL can be retrieved by the mobile device support 218. In some implementations, the cached content also can be cleared according to a schedule (e.g., after having been cached for an hour, a day, a month, etc.).

Alternatively, if the information corresponding to the target URL is available in the cache (410), the mobile device support 218, can retrieve the information from the cache 220 (425). For example, the mobile device support 218 can load the information, such as an RSS feed, corresponding to the target URL from the internal cache server 220 and parse the information. Parsing the information can include filtering out potentially dangerous portions of HTML and/or Javascript, while preserving the HTML formatting of the original information, such as the RSS feed. Parsing also can include creating an index page or summary page of the information included in the HTML page.

In either scenario above, the retrieved content corresponding to the target URL can be translated into an HTML page (430). For example, the mobile device support 218 can compose a translated HTML page from the contents of the original RSS feed. The translated HTML page can include specific optimizations for the particular browser being served. For example, the translated HTML page can be structured as an index page that includes links or news icons that were present in the original RSS feed. Further, the format of the translated HTML page can be selected based on the content of the RSS feed. Alternatively, the translated HTML page can be formatted in accordance with an RSS extension associated with the RSS feed. For example, if the RSS feed is comprised primarily of text, the translated HTML page can be structured as an index text page that includes links to full portions of text. Alternatively, if the RSS feed is comprised primarily of images, the translated HTML page can be structured in accordance with an image format, such as a gallery or image layout. Further, a translated HTML feed presented in a gallery layout can present one or more images, such as cover art corresponding to an album, which can be selected to retrieve information associated with the image, such as artist, label, tracks, and release date. Additionally, if an RSS feed includes geographic localization information (e.g., latitude and longitude) associated with an object, the translated HTML page can include a link to a web site that provides map information (e.g., maps.google.com) or a map can be embedded in the translated HTML page. For example, if an RSS feed includes geographic localization information associated with an image, the translated HTML page can include a information showing where the image was taken, such as a link to a map of the location or viewable map.

Further, the translated HTML page representing the translated information associated with the target URL also can be stored in the cache 220 (435). In an implementation, the translated HTML page can be associated with the target URL in the cache 220. Accordingly, the translated HTML page can be retrieved and transmitted to a mobile device 100 in response to a request identifying the target URL. Thus, the translation request can be satisfied without the delays associated with retrieving and parsing the target URL.

The mobile device support 218 also can send the translated HTML page to the mobile device 100 (440), such as for display to a user. In some implementations, the mobile device support 218 can compress the data representing the translated HTML page before transmitting the data to the mobile device 100. Additionally, the mobile device support 218 can be configured to encrypt the data representing the translated HTML page before transmitting the data to the mobile device 100.

When the browser 216 displays the translated HTML page, a user of the mobile device 100 can select links included in the translated HTML page to retrieve the full text associated with the selected link. For example, a link can be structured as a summary of an article and accessing the link can display the full article associated with the summary, while hiding any additional summaries. Further, the translated HTML page can be structured to provide an appearance that the user is traversing a plurality of pages by selecting links. The translated HTML page, however, can be structured to show content associated with the selected link while hiding the remainder of the translated HTML page. Thus, the selection of a link can provide the as appearance of a fast page change, although the user is navigating within a single HTML page. In some implementations, the translated HTML page also can be fully accessed when the mobile device 100 is not connected to the network 202. For example, a user can download one or more translated HTML pages, such as pages corresponding to one or more news websites. Once downloaded, a translated HTML page can be accessed at the user's convenience, even when the mobile device 100 has no network connectivity.

An RSS feed also can contain one or more images. For example, an RSS feed associated with a photo sharing website can include a gallery of images. A news story also can include one or more images. In the event that images are present in an RSS feed, the mobile device 100 can detect one or more extensible markup language (XML) tags included in the translated HTML file that identify the location of the images. Thus, the mobile device 100 can download the image files independently. Further, as discussed above, the translated HTML file can be structured as a gallery to improve the presentation of the images.

Further, an RSS feed can contain one or more media files, such as audio and/or video. For example, Web pages associated with the iTunes site (available from Apple Inc. of Cupertino Calif.) can include a particular extension for RSS feeds. A user of mobile device 100 can choose to open the iTunes application, which can automatically open an online page including selectable content. As such, when iTunes content is selected, an RSS feed is received. The RSS feed may include information such as album name, artist, song title, etc. The mobile device 100 can detect the receipt of RSS information upon accessing the iTunes site and can automatically request a translated HTML page so that the corresponding content can be rendered by the browser 216.

In some implementations, the service provider, such as the .MAC server 206, also can be configured to track statistics relating to content frequently requested by one or more mobile devices 100. For example, if one or more mobile devices 100 regularly request content associated with a particular website, the service provider can be configured to automatically download content from the website at regular intervals. Thus, a frequently requested item of content, such as an RSS feed, can be periodically fetched by the service provider, such that a recent version of the content is available in the service provider's cache.

Figure 5:
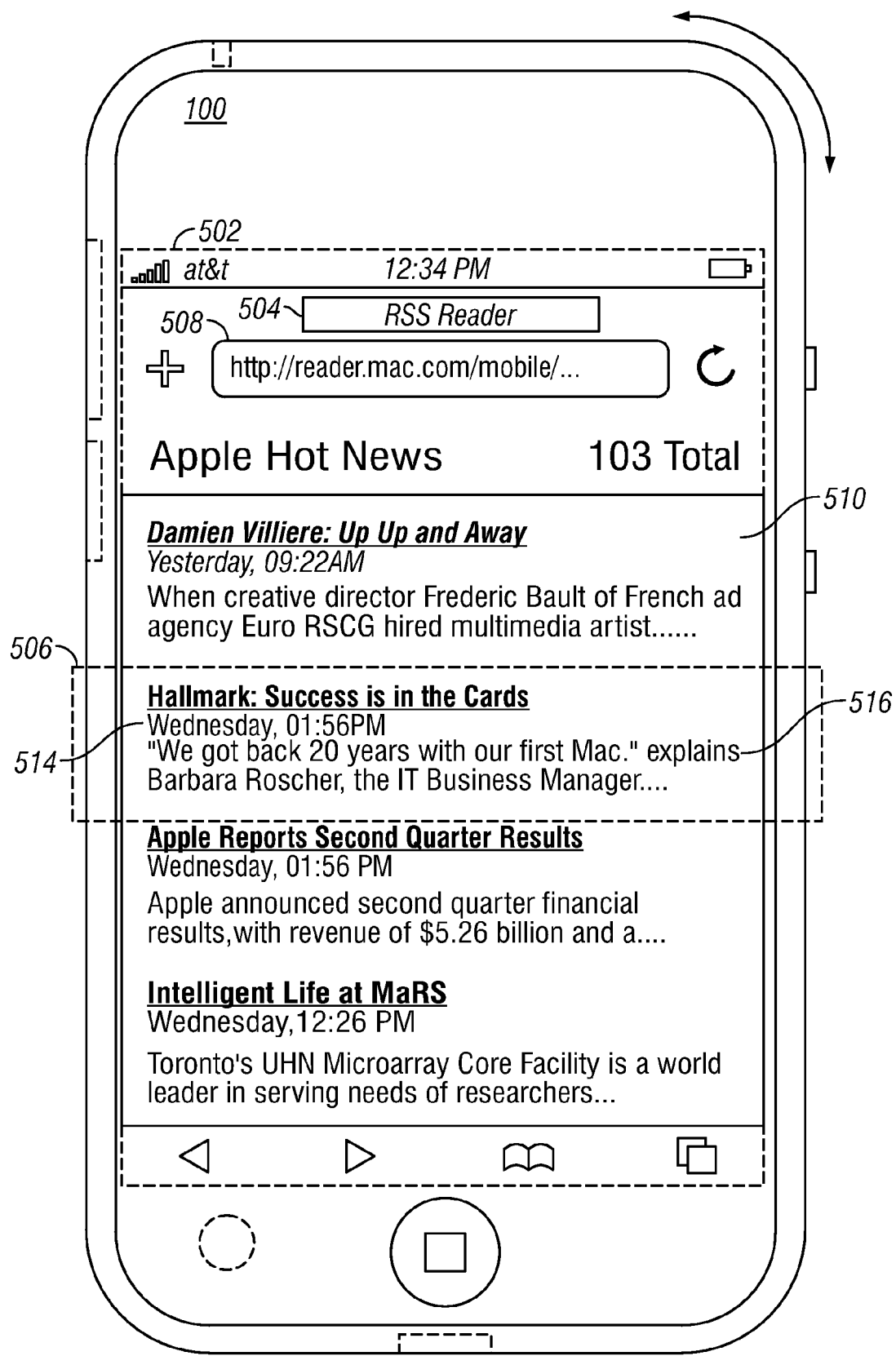
FIG. 5 shows a table of contents corresponding to a web page displayed on a mobile device.

FIG. 5 shows a table of contents corresponding to a web page displayed on a mobile device. A web browser 502 is displayed on the mobile device 100. The web browser 502 includes a title 504 indicating that it is displaying a translated version of an RSS feed, such as a translated HTML page received from a service provider. Further, the source of the translated version of the RSS feed is indicated in an address bar 508 below the title.

In the present example, the translated web page 510 presented in the web browser 502 includes a plurality of story summaries, including the story summary 506. The story summary 506 further includes details describing the story, such as a story title 512, a story date 514, and a story introduction 516. Further, the story summary 506 can be configured as a link, which can be selected to display the full version of the story. As described above, the translated web page 510 can be structured as an index, wherein the items displayed in the index, such as one or more story summaries, are configured as links to full versions of the summarized material. Further, accessing a link by selecting a story summary causes the mobile device 100 to display the content corresponding to the accessed link and to hide the remaining content. Thus, accessing a story summary can provide the appearance of accessing a different web page.

Figure 6:
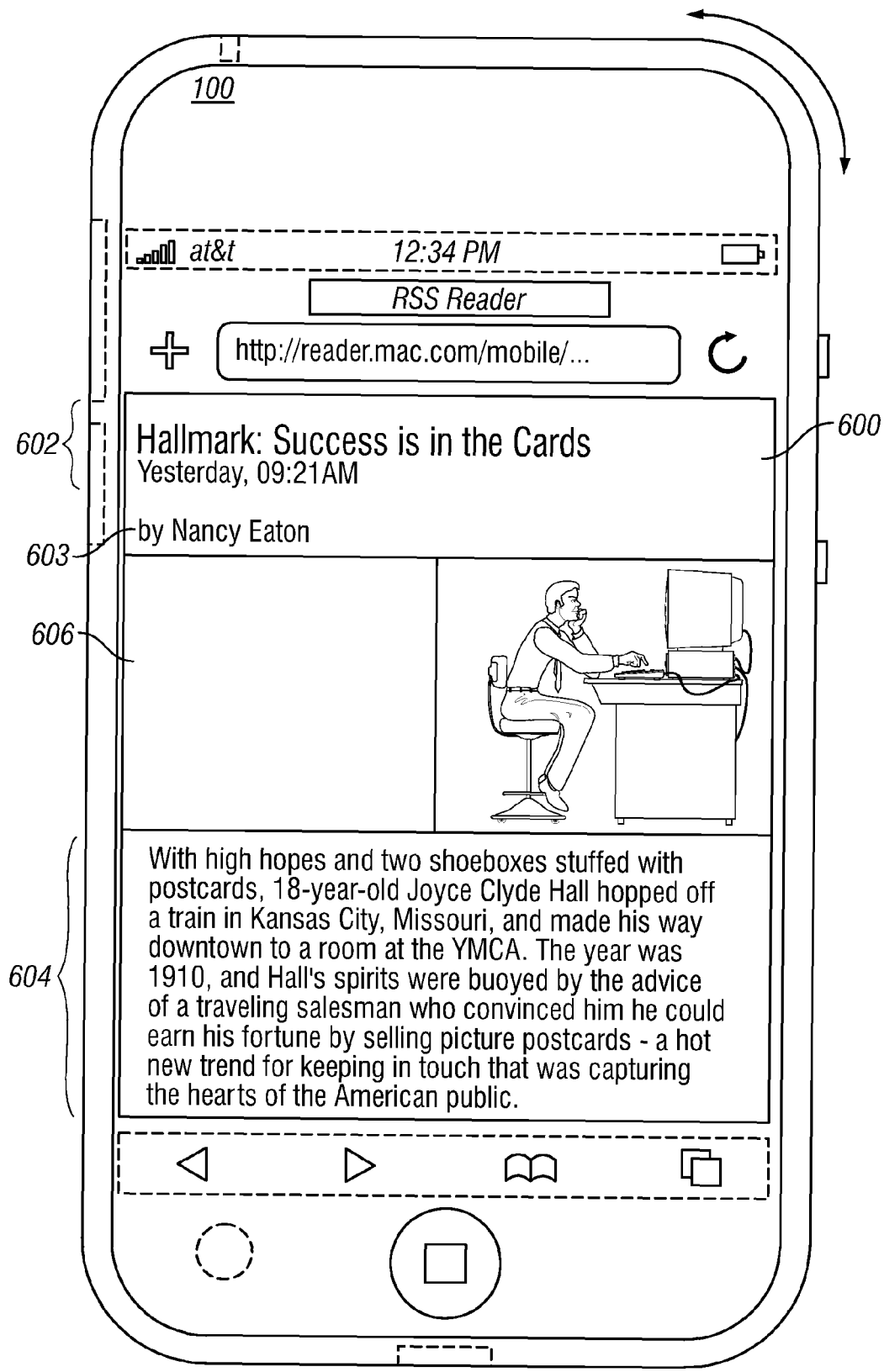
FIG. 6 shows a news story displayed on a mobile device.

FIG. 6 shows a full news story displayed on the mobile device 100. The full story 600 is displayed in response to selection of the story summary 506 presented in the translated web page 510. The full story 600 displayed in the browser 502, includes the title information 602 that corresponds to the story title 512 and a story date 514 displayed in the story summary 506. The title information 602 also identifies the author 603. Further, the full story 600 includes a full text portion 604 that contains the story text. If the story text exceeds the displayable area of the browser, the full text portion 604 can be scrolled. Additionally, an image 606 also can be included in the full story 600. In some implementations, the mobile device 100 can be configured to retrieve the image 606 independently, such that one or more included images are not transmitted with the translated HTML page.

Figure 7:
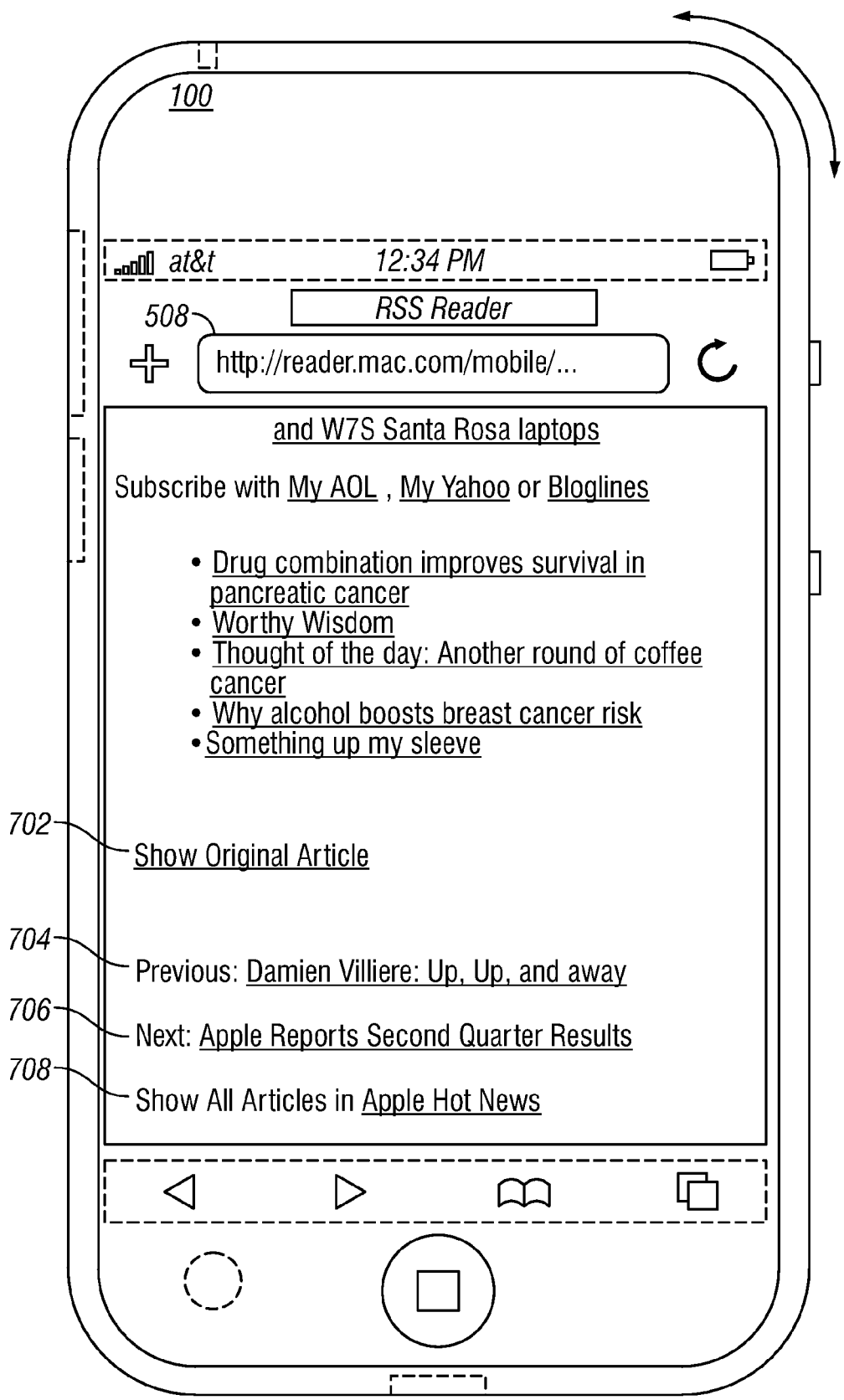
FIG. 7 shows a plurality of links included in content displayed on a mobile device.

FIG. 7 shows a plurality of links included in content displayed on a mobile device. For example, the plurality of links can be displayed at the end of a full story, such as the full story 600. The plurality of links can include a link to the original article 702, a link to the previous article 704 and a link to the next article 706, such as the previous and next articles in the index representation of the translated HTML page, and a link to the original source of the information 708. A user of the mobile device 100 can select any of the plurality of links displayed in the web browser 502 to access content corresponding to the link.

Figure 8:
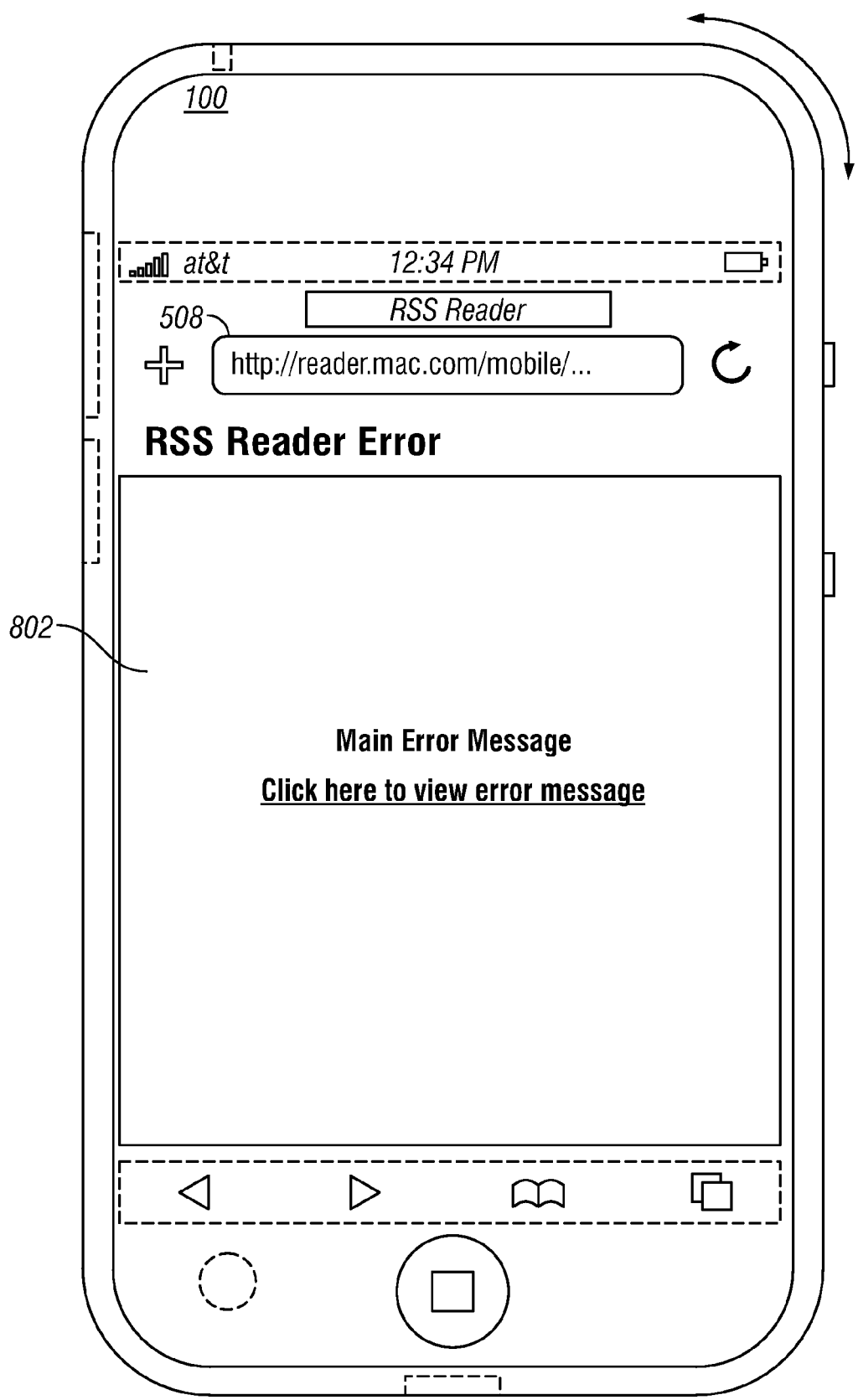
FIG. 8 shows an example error page displayed on a mobile device.

FIG. 8 shows an example error page displayed on a mobile device. One or more errors can result from the translation of information encoded as an RSS feed into an HTML page. An error message 802 can be presented in the web browser 502 to indicate that an error associated with an item of requested content has occurred. The error message 802 can be presented as a general error identifier. Further, the error message 802 can include a link that can be accessed to reveal detailed information regarding the error. For example, error details can indicate the type of error that has occurred, such as problems relating to translation, downloading, reformatting, availability of content, and communication related issues.

Figure 9:
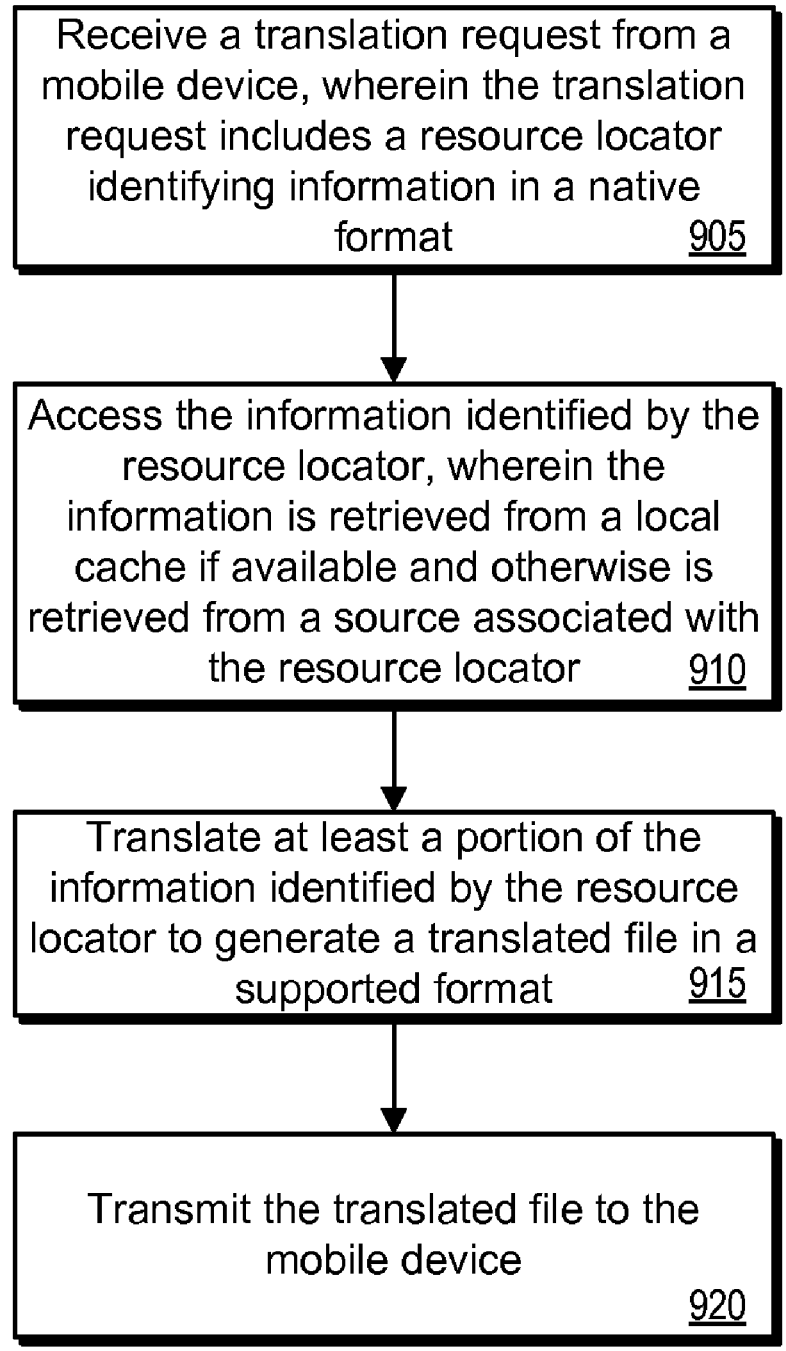
FIG. 9 shows a flowchart for providing information to a mobile device

FIG. 9 shows a flowchart for providing information to a mobile device. Initially, a translation request is received from a mobile device, wherein the translation request includes a resource locator identifying information in a native format (905). The information identified by the resource locator is accessed, wherein the information is retrieved from a local cache if available and otherwise is retrieved from a source associated with the resource locator (910). At least a portion of the information identified by the resource locator is translated to generate a translated file in a supported format (915). Once the translated file has been generated, the translated file is transmitted to the mobile device (920).

A number of implementations have been disclosed herein. Nevertheless, it will be understood that various modifications may be made without departing from the spirit and scope of the claims. Accordingly, other implementations are within the scope of the following claims.

What is claimed is:

1. A method of receiving information by a mobile device, the method comprising:
   receiving, from a source system associated with a resource locator, information in a native format;
   before said receiving has completed, detecting that the native format is unsupported by the mobile device;
   responsive to said detecting,
      interrupting said receiving, and
      requesting, from a service provider system different from the source system associated with the resource locator, the information in a format supported by the mobile device, said requesting including transmitting, to the service provider system, the resource locator identifying the information in the unsupported native format;
   receiving, from the service provider system, the requested information in the format supported by the mobile device; and
   presenting the received information.

2. The method of claim 1, wherein the native format corresponds to an RSS feed.

3. The method of claim 1, wherein said detecting the unsupported format is based on a value included in a content-type field.

4. The method of claim 1, wherein said receiving the requested information in the format supported by the mobile device comprises receiving a HyperText Markup Language file.

5. The method of claim 4, wherein said presenting comprises:
   displaying the received file as an index including a plurality of links, wherein selecting a link causes a first portion of the received file to be hidden and a second portion of the received file to be displayed.

6. A computer program product, encoded on a non-transitory computer-readable medium, operable to cause data processing apparatus to perform operations comprising:
   receiving, from a source system associated with a resource locator, information in a native format;
   before said receiving has completed, detecting that the native format is unsupported by the data processing apparatus;
   responsive to said detecting,
      interrupting said receiving, and
      requesting, from a service provider system different from the source system associated with the resource locator, the information in a format supported by the data processing apparatus, said requesting including transmitting, to the service provider system, the resource locator identifying the information in the a unsupported native format;
   receiving, from the service provider system, the requested information in the format supported by the mobile device; and
   presenting the received information.

7. The computer program product of claim 6, wherein the native format corresponds to an RSS feed.

8. The computer program product of claim 6, wherein said detecting the unsupported format is based on a value included in a content-type field.

9. The computer program product of claim 6, further operable to cause data processing apparatus to perform said receiving the requested information in the format supported by the data processing apparatus through operations comprising receiving HyperText Markup Language file.

10. The computer program product of claim 9, further operable to cause data processing apparatus to perform said presenting through operations comprising:
   displaying the received file as an index including a plurality of links, wherein selecting a link causes a first portion of the received file to be hidden and a second portion of the received file to be displayed.

11. A mobile device comprising:

a display; and a processor communicatively coupled with the display, the processor configured to perform operations comprising:

receiving, from a source system associated with a resource locator, information in a native format;

before said receiving has completed, detecting that the native format is unsupported by the processor;

responsive to said detecting, interrupting said receiving, and requesting, from a service provider system different from the source system associated with the resource locator, the information in a format supported by the processor, said requesting including transmitting, to the service provider system, the resource locator identifying the information in the unsupported native format;

receiving, from the service provider system, the requested information in the format supported by the processor; and displaying the received information on the display.

12. The mobile device of claim 11, wherein the native format corresponds to an RSS feed.

13. The mobile device of claim 11, wherein said detecting the unsupported format is based on a value included in a content-type field.

14. The mobile device of claim 11, wherein, to perform said receiving the requested information in the format supported by the processor, the processor is further configured to perform operations comprising receiving a HyperText Markup Language file.

15. The mobile device of claim 14, wherein, to perform said displaying, the processor is further configured to perform operations comprising presenting the received file as an index including a plurality of links, wherein selection of a link causes a first portion of the received file to be hidden and a second portion of the received file to be displayed.

* * * * *

UNITED STATES PATENT AND TRADEMARK OFFICE
CERTIFICATE OF CORRECTION

| | | |
|---|---|---|
| PATENT NO. | : 7,921,187 B2 | |
| APPLICATION NO. | : 11/770459 | |
| DATED | : April 5, 2011 | |
| INVENTOR(S) | : Stephane Lunati et al. | |

It is certified that error appears in the above-identified patent and that said Letters Patent is hereby corrected as shown below:

In column 2, line 20, delete "locator." and insert -- locator --, therefor.

In column 4, line 4, delete "device" and insert -- device. --, therefor.

In column 5, line 41, delete "functionality" and insert -- functionality. --, therefor.

In column 14, line 47, in Claim 6 delete "the a" and insert -- the --, therefor.

In column 14, line 62, after "receiving" insert -- a --.

Signed and Sealed this
Twenty-ninth Day of November, 2011

David J. Kappos
*Director of the United States Patent and Trademark Office*